(12) United States Patent
Kamstra et al.

(10) Patent No.: US 6,768,720 B1
(45) Date of Patent: Jul. 27, 2004

(54) VERIFICATION OF LINK INTEGRITY OF A HOME LOCAL AREA NETWORK

(75) Inventors: Duke Kamstra, Thousand Oaks, CA (US); Arthur J. Bonaker, Jr., Placentia, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/409,360

(22) Filed: Sep. 30, 1999

(51) Int. Cl.[7] .......................... G01R 31/05; G06F 11/00
(52) U.S. Cl. ...................... 370/245; 370/248; 379/1.03
(58) Field of Search .............................. 370/245, 241, 370/242, 244, 248, 252, 352, 395.1, 401, 908, 216, 243, 229, 230, 235; 379/1.01, 1.03, 1.04; 714/100, 1, 2, 25, 47, 48

(56) References Cited

U.S. PATENT DOCUMENTS

| | | | | |
|---|---|---|---|---|
| 5,448,723 A | * | 9/1995 | Rowett | 714/4 |
| 5,754,764 A | * | 5/1998 | Davis et al. | 709/200 |
| 5,905,781 A | * | 5/1999 | McHale et al. | 379/93.15 |
| 6,078,970 A | * | 6/2000 | Nordstrom et al. | 710/19 |
| 6,385,203 B2 | * | 5/2002 | McHale et al. | 370/401 |
| 2001/0043568 A1 | * | 11/2001 | McHale et al. | 370/254 |

\* cited by examiner

*Primary Examiner*—Brian Nguyen
(74) *Attorney, Agent, or Firm*—Akin Gump Strauss Hauer & Feld LLP

(57) ABSTRACT

A home network controller provides a user-visible indication of the integrity of a physical connection to a home network. The home network controller periodically checks an interrupt status register for receipt of a physical-layer packet. Receipt of a physical-layer packet serves as a proxy for a functional physical connection, and non-receipt of a packet serves as a proxy for a non-functional physical connection. To avoid race conditions, the controller will indicate failure of a previously functional physical connection if no packet was received during the period but a packet was transmitted during the period and a packet was transmitted during the immediately previous period. A heartbeat signal avoids deadlocks by transmitting a packet if the interrupt status register indicates no packets were received or transmitted during the period.

11 Claims, 5 Drawing Sheets

VERIFICATION OF LINK INTEGRITY OF A HOME LOCAL AREA NETWORK

BACKGROUND

1. Field of the Invention

The present invention relates to home networking systems, in particular to a home local area network (LAN) having the capability to detect media in the network.

2. Description of the Related Art

The personal computer has become a powerful platform in the home for work, communication, education and entertainment. As the Internet becomes an essential means of information access, many new digital appliances are being developed to exploit communication of voice and video across digital networks Just as there is a critical need for high-speed connections to information and broadband entertainment sources outside the home, there is a growing need to rapidly move digital data between devices within the home. Businesses accomplish this by deploying local area networks (LANs); however, networks are not commonly deployed in the home due to the cost and complexity of installing the new wiring required by traditional LANs. A need to share Internet access, digital information, and computing resources among PCs and other information appliances has sparked consumer demand for a home networking solution. Several groups have proposed solutions which create a network in the home that will utilize existing resources such as telephone wiring, power lines, or radio-frequency (RF) transmission to connect computers and devices without requiring expensive rewiring of the home.

Although office LANs may have dedicated personnel to manage the networks, home LANs are unlikely to have such dedicated management personnel. End-users will want a network which is easy to troubleshoot when something goes wrong. One concern with a network, particularly one such as a home network, is link integrity, or a concern with the physical connection to the network. End users expect some kind of visual indication that a physical connection in the network is working. With traditional networks such as 10Base-T Ethernets, hub devices and transceivers exchange hardware link heartbeat pulses when the connection is idle. Either the hub or the transceiver can display a visual indication of packet transmission as an indication of link integrity.

Home LANs without a centralized hub device typically do not have a hardware means of detecting link integrity. In addition, standard tests used to certify Network Interface Cards (NMCs) can fail a "media detect" test because of the lack of an indication of link integrity.

Many other problems and disadvantages of the prior art will become apparent to one skilled in the art after comparing such prior art with the techniques as described herein.

SUMMARY OF THE INVENTION

Briefly, a home network controller provides indication of the integrity of a link in a home local area network (LAN). The home network controller can provide a visual indicator of the status of the link to assist in troubleshooting of the home LAN.

The home network controller includes a physical interface connected to a link of the home LAN. Software and circuitry in the home network controller monitor the status of the link to verify link integrity.

The home network controller uses receipt of a physical layer packet as a proxy for link integrity. The home network controller software reads an interrupt status register to check for receipt and transmission of a packet during a current monitoring period.

If a packet has been received since the previous check of the interrupt status register, then the link is declared working To avoid false indications of link failure caused by a transmission at a tail end of a previous monitoring period, the home network controller software can make a decision based on two successive periods. If during the preceding period a packet was transmitted, but no packet was received during the current period, then an indication that packet transmission occurred in the current period indicates that the link has failed.

To avoid deadlocks, the home network controller can stimulate packet transmission by using a heartbeat signal. The heartbeat signal will transmit a packet on the home LAN if no packet was received and no packet was transmitted during the current period, as evidenced by the interrupt status register.

BRIEF DESCRIPTION OF THE DRAWINGS

A better understanding of the present invention can be obtained when the following detailed description of the invention is considered in conjunction with the following drawings.

DETAILED DESCRIPTION OF THE DRAWINGS

Figure 1:
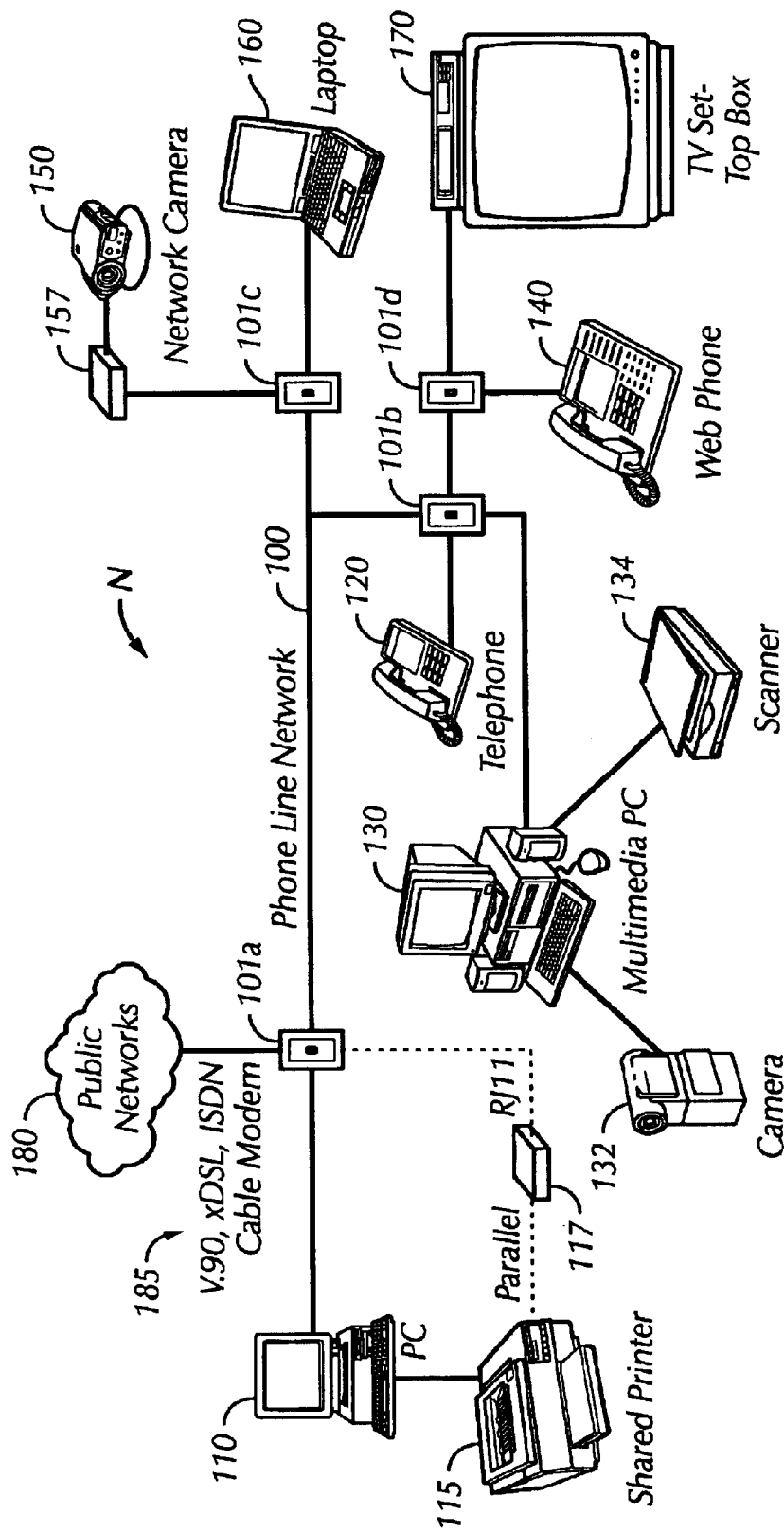
FIG. 1 is a block diagram of an exemplary home LAN N.

FIG. 1 is a block diagram of exemplary home LAN N. The exemplary home LAN N is a home phoneline network. In one embodiment, the home LAN can be a Home Phoneline Network as defined by the Home Phoneline Network Alliance (HomePNA). One skilled in the art will recognize that other home network techniques could be used without departing from the spirit of the invention.

In the exemplary LAN N, the home telephone wiring 100 provides the links of the home LAN N. As shown in FIG. 1, numerous devices can be connected to the network N by connecting a physical link to each device such as a cable to a standard RJ-11 telephone jack 101 (shown as 101a–101d). Multiple devices can be connected to the same telephone jack 101 through any technique known in the art for connecting multiple telephones to a single jack. As shown in FIG. 1, devices which can be directly connected to the LAN N include a PC 110, a multimedia PC 130, a laptop 160, a TV set-top box 170, and a web phone 140 which provides web browser capabilities in a telephone. Because a home phoneline network as in the exemplary LAN N allows existing telephone equipment to share the existing telephone wiring 100 with the LAN N, a standard telephone 120 can also be connected as shown in FIG. 1. Other devices, such as camera 132, scanner 134, and shared printer 115 which are directly connected to another device on the LAN N can be accessible to other devices on the network N. Special purpose connection devices 117 and 157 can be used to allow devices such as the network camera 150 and the shared printer 115 to have their own direct connection to the home LAN N.

The home LAN N can itself be connected to public networks 180 such as the Internet by using a communications connection device 185, shown in FIG. 1 as a V.90, xDSL, ISDN, or cable modem. The communications connection device may be attached to another device on the network, such as the PC 110, or may connect as a standalone device. Each of the PC 110, multimedia PC 130, web phone 140, TV set-top box 170, laptop 160, and connection devices 117 and 157 will need home network controllers to which the link to the telephone jack 101 is connected. Because the home network controllers will typically be contained inside the network-connected devices, the home network controllers are not shown in FIG. 1.

Figure 2:
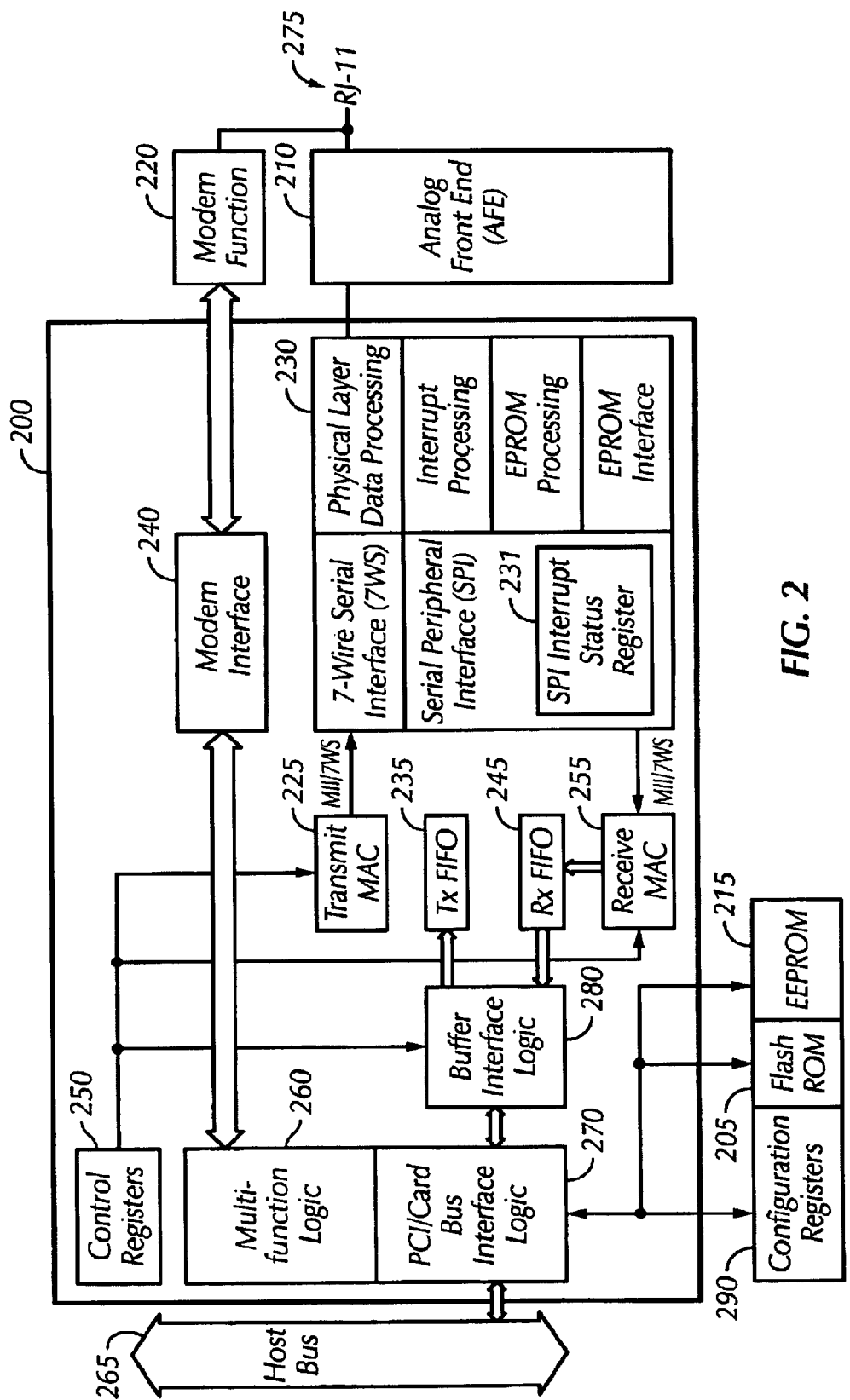
FIG. 2 is a block diagram of an exemplary home network controller for use with the home LAN N

Turning now to FIG. 2, a block diagram of an exemplary home network controller 200 for use with the home LAN N is shown. The home network controller 200 is a am multifunction device containing both modem and home networking circuitry, providing the capability for simultaneous modem and network operation. The home network controller 200 connects lo a PC via a host bus 265. Connection to the physical network is made via a link connected to an RJ-11 connector 275. The link can be a wire medium as defined by the HomePNA specification. The physical connection is split between a modem function module 220 and a networking analog front end (AFE) 210.

Modem data is passed between the modem function module 220 and a modem interface 240. Modem data is passed between the modem interface 240 and a multifunction logic module 260 and from there via a PCI/Card Bus interface logic module 270 to the host bus 265.

Network data is received from the AFE 210 by a physical layer module 230. The physical layer module 230 can contain modules for physical layer data processing, interrupt processing, EPROM processing, as well as an EPROM interface, a 7-wire serial interface (7WS), and a serial peripheral interface (SPI). An SPI interrupt status register 231 is contained within the SPI of the physical layer module 230. In one embodiment, the physical layer module 230 and AFE 210 can be combined into a single integrated device external to the home network controller 200.

Data received from the network is processed by the physical layer module 230 and sent to a receive Media Access Control (MAC) 255 which performs MAC-layer processing before sending data to a receive (Rx) FIFO 245. The receive FIFO 245 passes data to a buffer interface logic module 280.

The buffer interface logic module 280 also sends data to a transmit (Tx) FIFO 235 which sends data to a transmit MAC 225 for MAC-layer processing before sending the data to the physical layer control module 230 for transmission. Network data from and to a host is received from and sent to the host bus 265 via the PCI/Card Bus interface logic module 270 and the buffer interface logic module 280. A network interface card (NIC) in the host (not shown) will see the same MAC-layer packets as would a conventional Ethernet NIC. In one embodiment, software drivers in a host can access the SPI interrupt status register 231 via registers in the receive MAC 255 and the transmit MAC 225. In one embodiment, circuitry for a user-visible visual indicator of link status can be attached to the home network controller 200.

A set of configuration registers 290 provides configuration data for the home network controller 200. A set of control registers 250 is used to control the multifunction logic module 260, PCI/Card Bus interface logic 270, the receive MAC 255, and the transmit MAC 225. In addition, a flash ROM 205 and an EEPROM 215 provide non-volatile storage for control code and firmware.

Unless the home network controller 200 can detect the presence of at least one other node on the home LAN N, then the link is considered non-functional. An advantage of using detection of the presence of at least one other node (instead of a hardware indication that the home network controller 200 is connected to the RJ-11 jack 101) is that node detection is demand-driven and handles the two-line case where the home network controller 200 is plugged into the wrong telephone line 100. The SPI interrupt status register 231 indicates both packet transmitted and packet received status. The packet received status indicates reception of a physical layer (PHY) packet, i.e., a PHY-level broadcast seen by all nodes in the home LAN N, rather than a MAC-level (address filtered) packet directed to the home network controller 200. As such, this status will be set in the SPI interrupt status register 231 whenever any node (including the home network controller 200 itself) transmits a packet which is received by the home network controller 200, regardless of MAC destination address. Therefore, as long as any node on the home LAN N is transmitting packets, the home network controller 200 will indicate that the link is functional.

Figure 3:
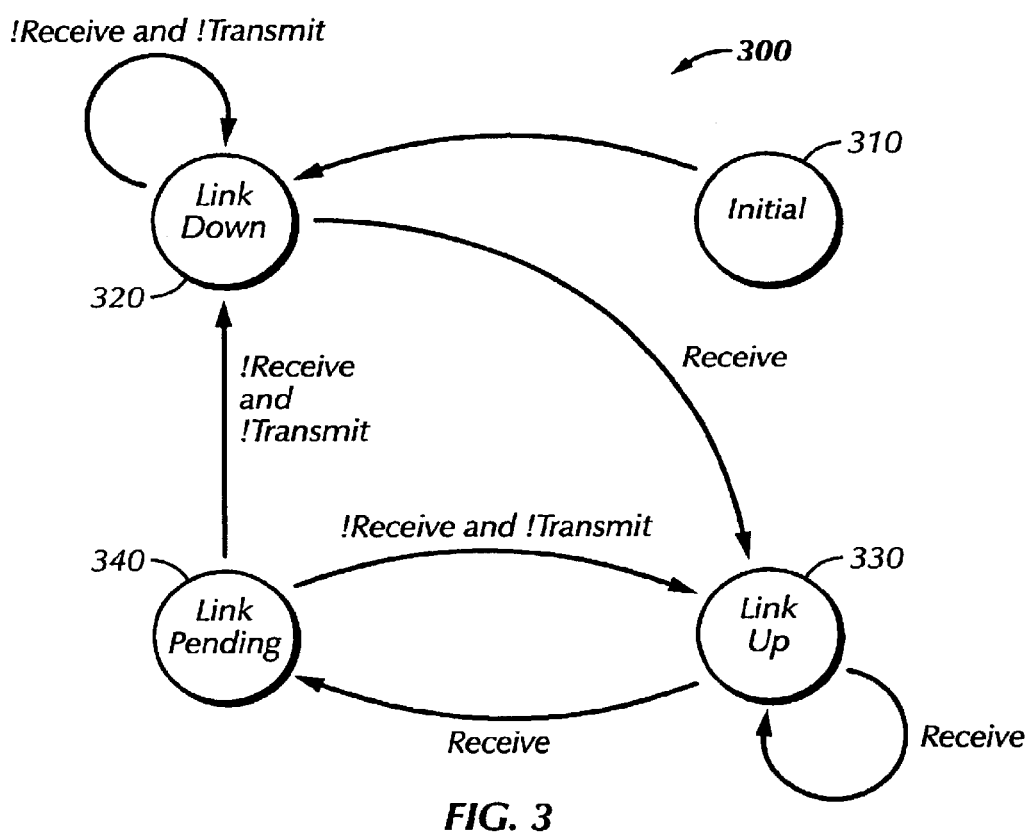
FIG. 3 is a diagram of an exemplary state machine for a home network controller for use with the home LAN N.

Turning to FIG. 3, an exemplary state diagram 300 shows the functioning of an exemplary state machine contained within the physical layer module 230 of the home network controller 200 according to a disclosed embodiment. An initial state 310 resets the SPI interrupt status register 231 contained in the physical layer module 230 and transitions into a link down state 320. While in the link down state 320, if a visual indicator is attached to the home network controller 200, the visual indicator will indicate to the user that the link is non-functional. The state machine 300 will stay in the link down state 320 if the SPI interrupt status register 231 indicates non-receipt of a packet (!RECEIVE) and non-transmission of a packet (!TRANSMIT). If the SPI interrupt status register 231 indicates receipt of a packet, then the state machine 300 will transition from the link down state 320 to a link up state 330. The state machine 300 will stay in the link up state 330 as long as the SPI interrupt status register 231 indicates receipt of a packet (RECEIVE).

Non-receipt of a packet (!RECEIVE) will cause a transition from the link up state 330 toward the link down state 320. If the SPI interrupt status register 231 indicates non-receipt of a packet (!RECEIVE) and non-transmission of a packet (!TRANSMIT), then the state machine 300 will transition to a link pending state 340. If the SPI interrupt status register 231 indicates receipt of a packet (RECEIVE) while in the link pending state 340, then the state machine 300 will transition back to the link up state 330. If the SPI interrupt status register 231 indicates non-receipt of a packet (!RECEIVE) and non-transmission (!TRANSMIT) of a packet while in the link pending state 340, then the state machine 300 will transition to the link down state 320. The link pending state 340 provides a guard against false UP-to-DOWN demotions due to race conditions, e.g., no packets were received and the home network controller 200 did not attempt a transmit until the very end of a monitoring period.

Note that certain conditions are undefined in the state diagram 300. In particular, if the SPI interrupt status register 231 indicates non-receipt of a packet and transmission of a packet (!RECEIVE & TRANSMIT), then no state transition occurs.

One skilled in the art will recognize that this state machine 300 is exemplary and illustrative and other implementations of a state machine could be implemented without departing from the spirit of the invention. For example, use of a state machine variable could replace the use of the link pending state 340. Although not shown in the state diagram of FIG. 3, a disclosed embodiment can transmit a heartbeat packet on every transition other than the transition from the initial step 310 which does not end in the link up state 330. A heartbeat packet is a PHY packet broadcast on a LAN that is otherwise idle. A problem can occur on an idle home LAN N when one node of the home LAN N becomes the lone packet initiator. For example, the situation can occur on an otherwise idle home LAN N where one node issues a Address Resolution Protocol (ARP) request every second destined for a non-existent (and therefore non-responding) Internet Protocol (IP) address. In that case, the node's repeated ARP frame transmissions prevent the other, idle stations from sending packets, thus it will falsely force the state machine 300 into this undefined state. To avoid such deadlock problems, the home network controller 200 can implement a heartbeat signal that stimulates transmission of a packet if the SPI interrupt status register 231 indicates no packet has been received or transmitted during the monitoring period.

The determination of the link state by the state machine 300 can interact with power management routines in the host through an NDIS driver. By passing the link state to the NDIS driver from the home network controller 200, the power management routines can initiate a low power state for the NIC. Likewise, the home network controller 200 can cause a wake-up event in the NIC based on its indication that the link is in the link up state 330. One skilled in the art will recognize that other link-down and link-up requests are possible and could use the link state from the home network controller 200.

Figure 4:
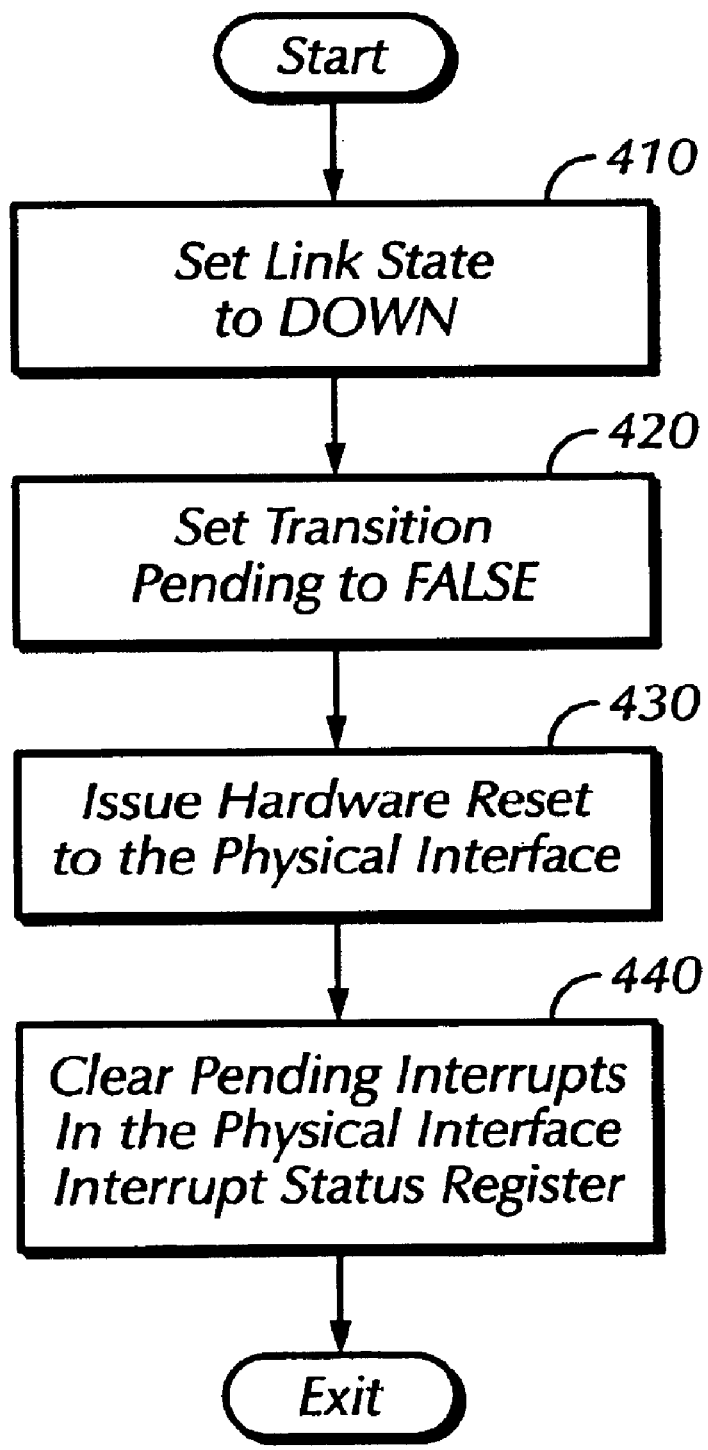
FIG. 4 is a flowchart with an exemplary initialization module used by software for the home network controller of FIG. 2.

Turning to FIG. 4, a flowchart of an exemplary initialization module used by software for the home network controller 200 is shown. In step 410, the initialization module sets the state of the link to DOWN. In step 420, the initialization module sets a transition pending variable to FALSE for use by a state machine 300 which does not use a link pending state.

In step 430, the initialization module issues a hardware reset to the physical layer module 230. Finally, in step 440, the initialization module clears all pending interrupts in the physical interface module 230's SPI interrupt status register 231.

Figure 5:
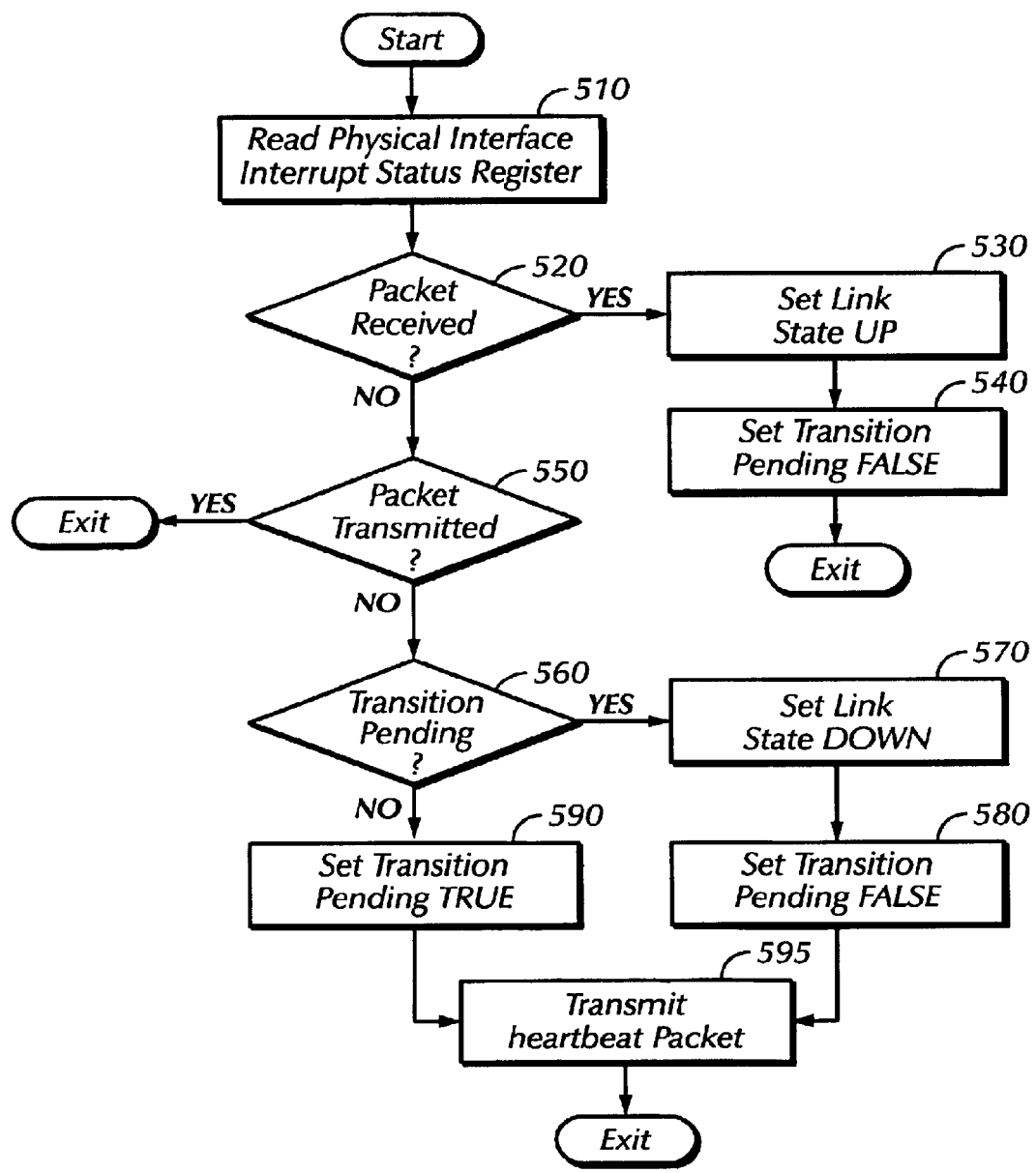
FIG. 5 is a flowchart of an exemplary module to verify link integrity in the home network controller of FIG. 2.

Turning now to FIG. 5, a flowchart of an exemplary verification module to verify link integrity in the home network controller 200 is shown. In step 510, the verification module reads the SPI interrupt status register 231 of the physical layer module 230 to determine whether a packet has been received or a packet has been transmitted, storing the contents of the SPI interrupt status register 231 into a temporary variable. In step 520, the verification module checks the packet received indication from the SPI interrupt status register 231 stored in the temporary variable. If a packet has been received the verification module sets a link state to UP in step 530, then in step 540 sets the transition pending variable to FALSE and exits. If no packet has been received in step 520, then in step 550 the verification module checks the packet transmitted indication from the SPI interrupt status register 231 stored in the temporary variable. If a packet has been transmitted, then the verification module exits with no change in the link state.

If step 550 determines no packet has been transmitted, then in step 560, the verification module checks the transition pending variable. If the transition pending variable indicates a transition is pending because a packet was transmitted in a previous execution of the verification module, then in step 570 the verification module sets the link state to DOWN, because the previously transmitted packet should have been received by the home network controller 200. The verification routine then sets the transition pending flag to FALSE in step 580 then exits. If no transition is pending, the verification module sets the transition pending variable to true, in step 590, then exits. In a disclosed embodiment, steps 580 and 590 are followed by a step 595 which cause the home networking controller 200 to transmit a heartbeat packet. Like the link pending state 340, the transition pending variable provides a guard against UP-to-DOWN demotions due to race conditions, e.g., no packets received and the home network controller 200 did not attempt a transmit until the very end of the monitoring period.

The verification module will be called by the physical layer module 230 on a periodic basis. In a disclosed embodiment, the verification module is called every two seconds, analogous to the way link integrity tests are done in traditional Internet transceivers and hubs. After each call of the verification module, the physical layer module 230 can clear the SPI interrupt status register 231. One skilled in the art will recognize that other implementations of verification modules are possible. For example, a state machine which uses a separate link pending state may not use a transition pending variable. In another embodiment, the verification module can be called every second rather than every other second, maintaining a pending count rather than a pending state, ensuring more frequent transmission of heartbeat packets. In one embodiment, the initialization and verification modules execute in a software driver in the device to which the home network controller is attached, e.g., a personal computer. In another embodiment, the initialization and verification modules execute in firmware contained in the home network controller 200.

The disclosed embodiments are not exhaustive and are only exemplary for network systems such as a home LAN. It should be understood that the techniques according to the present invention can be applied to any system (e.g., HomeRF) where hardware link detection is problematic. The particular structure and connections in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method to verify link integrity of a home local area network, comprising the steps of:

reading an interrupt status variable of a link controller for indicating receipt and non-receipt of a packet and transmission and non-transmission of a packet by the link controller on the link;

setting a link transition pending variable to indicate an absence of a pending link transition if the interrupt status variable indicates receipt of a packet;

setting a link state variable of the link controller to indicate the link is a working link if the interrupt status variable indicates receipt of a packet;

setting the link transition pending variable to indicate a pending link transition if the interrupt status variable indicates non-receipt of a packet and non-transmission of a packet when the link state variable indicates the link is a working link; and setting the link state variable to indicate t the link is a non-working link if the interrupt status variable indicates non-receipt of a packet and non-transmission of a packet.

2. A method as in claim 1, further comprising the step of: clearing die interrupt status variable.

3. A method as in claim 1, further comprising the step of: initializing the link state variable to indicate a non-working link.

4. A method as in claim 1, further comprising the step of: initializing the interrupt status variable to clear indications of packets received and packets transmitted.

5. A method as in claim 1, further comprising the step of: providing a heartbeat signal to transmit a packet whenever no packets are transmitted or received within a predetermined period.

6. A method to verify link integrity of a home local area network, comprising the steps of:

reading an interrupt status variable of a link controller for indicating receipt and non-receipt of a packet and transmission and non-transmission of a packet by the link controller on the link;

setting a link transition pending variable to indicate an absence of a pending link transition if the interrupt status variable indicates receipt of a packet;

setting a link state variable of the link controller to indicate the link is a working link if the interrupt status variable indicates receipt of a packet;

setting the link state variable to indicate the link is a non-working link if the interrupt status variable indicates non-receipt of a packet and non-transmission of a packet; and setting the link state variable to indicate the link is a non-working link if the interrupt status variable indicates non-receipt of a packet and non-transmission of a packet when the link transition pending variable indicates a pending link transition.

7. A network system adapted to verify the link integrity of a home local area network, comprising:

a home local area network;

a personal computer;

a home network controller coupling the personal computer to the home local area network, the home network controller comprising:

a home local area network physical interface coupled to a link to the home local area network; and verification software to verify the integrity of the link to the home local area network, comprising:

code to read an interrupt status variable;

code to indicate successful verification if the interrupt status variable indicates receipt of a packet;

code to indicate no attempt to transmit a packet if the interrupt status variable indicates non-transmission of a packet; and code to indicate unsuccessful verification if the interrupt status variable indicate non-receipt of a packet and non-transmission of a packet in a next period after execution of the code to indicate no attempt to transmit a packet, wherein the verification software to verify the integrity of the link to the home local area network uses successful receipt of a physical-layer packet as a proxy for the link integrity of the home local area network.

8. A network system as in claim 7, the verification software further comprising:

code to clear the interrupt status variable.

9. A network system as in claim 7, further comprising:

circuitry to provide a user-visible indication of link integrity responsive to verification of the integrity of the link to the home local area network.

10. A network system as in claim 7, herein the verification software executes in the personal computer.

11. A network system as in claim 7, the home local area physical network interface comprising:

an interrupt status register to store an interrupt status variable to indicate receipt of a packet and transmission of a packet.

* * * * *

UNITED STATES PATENT AND TRADEMARK OFFICE
CERTIFICATE OF CORRECTION

PATENT NO.    : 6,768,720 B1
DATED         : July 27, 2004
INVENTOR(S)   : Duke Kamstra et al.

It is certified that error appears in the above-identified patent and that said Letters Patent is hereby corrected as shown below:

<u>Column 7,</u>
Line 6, correct "indicate t the link" to read -- indicate the link --

<u>Column 8,</u>
Line 36, correct "herein" to read -- wherein --

Signed and Sealed this

Twenty-eighth Day of September, 2004

JON W. DUDAS
*Director of the United States Patent and Trademark Office*